Dec. 29, 1964 R. A. SCHLUTTENHOFER 3,163,719
TRUNK TRANSFER CIRCUIT
Filed Oct. 31, 1962 2 Sheets-Sheet 1

INVENTOR
R. A. SCHLUTTENHOFER
BY R. C. Winter
ATTORNEY

Dec. 29, 1964 R. A. SCHLUTTENHOFER 3,163,719

TRUNK TRANSFER CIRCUIT

Filed Oct. 31, 1962

2 Sheets-Sheet 2

United States Patent Office 3,163,719

Patented Dec. 29, 1964

3,163,719

TRUNK TRANSFER CIRCUIT

Ralph A. Schluttenhofer, Reynoldsburg, Ohio, assignor to Bell Telephone Laboratories, Incorporated, New York, N.Y., a corporation of New York Filed Oct. 31, 1962, Ser. No. 234,449
10 Claims. (Cl. 179—18)

Figure 1:
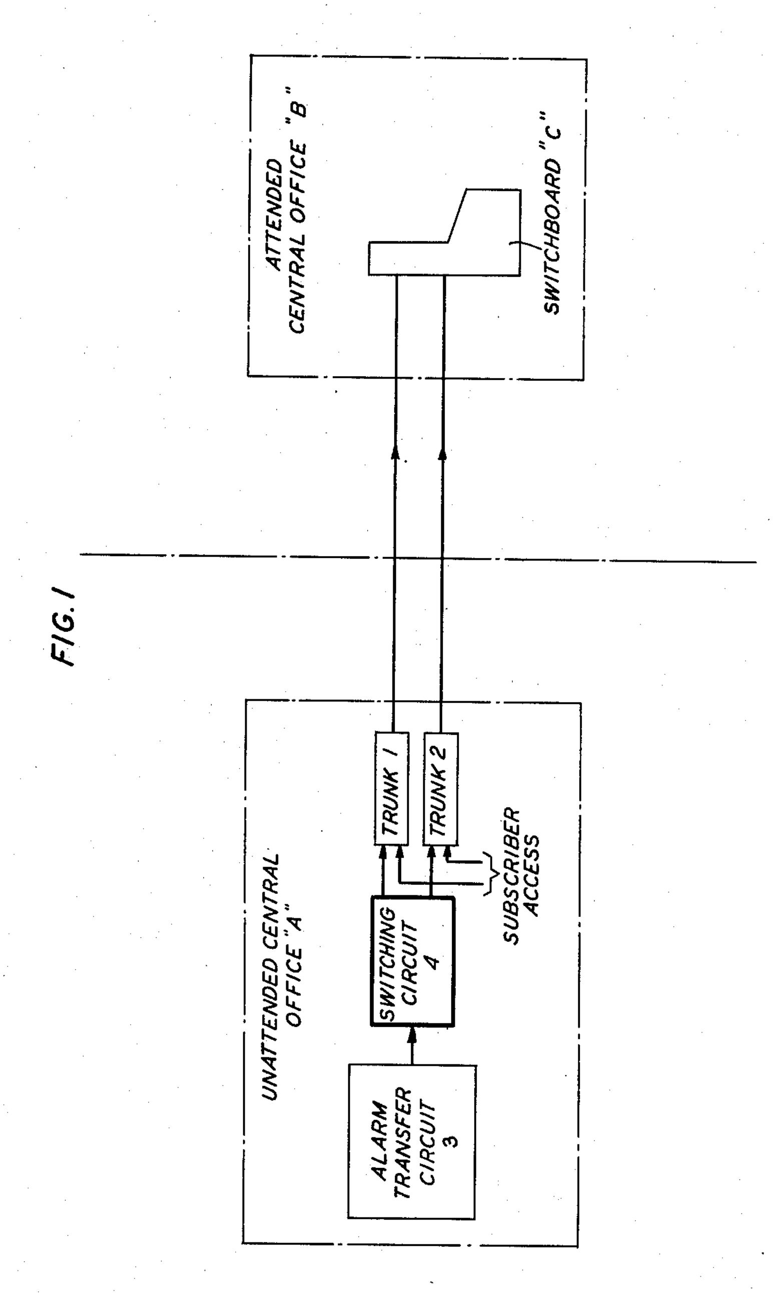

This invention relates generally to switching equipment in an automatic telephone system and particularly to switching equipment which automatically selects other equipment in response to a predetermined condition. More particularly, this invention relates to switching equipment capable of seizing one of a plurality of circuits and, upon failure to receive a response from that circuit, to repeatedly bid for seizure of another one of the circuits until such seizure is successful and to thereupon release the originally seized circuit.

Intensive development and perfection of trouble detecting and trouble recording equipment in automatic telephone central offices has led to a diminishing need to maintain central office maintenance personnel on an around-the-clock basis at these locations. In many such central offices today, the equipment is unattended except for periodic visits to perform routine preventive maintenance.

It is, of course, obvious that equipment troubles occur in these offices from time to time which necessitate unscheduled visits in order to correct them. The speed with which a repairman should be dispatched to correct such troubles is dependent upon whether the trouble is major (power failure, etc.) or minor (trouble not significantly affecting service). Therefore, alarm transfer circuits have been provided in the past which are capable of advising personnel at an attended location that trouble has occurred and to further advise them of the nature of the trouble. For example, in a typical arrangement, when trouble occurs in an unattended office, a direct trunk to an operator is seized, and a predetermined signal advises the operator that a trouble condition prevails in the unattended office. The operator thereupon dials a predetermined code assigned to the alarm transfer circuit in the unattended office and is informed by suitable tone signals via the trunk as to the nature of the trouble.

However, as noted above, the trend is toward more lengthy periods of unattended operation of many central offices. Also, today, many unattended offices serve a relatively large group of subscribers in addition to controlling critical data transmission lines for business use. Furthermore, the associated trunk or switchboard equipment may be defective, so that an alarm condition reported over a particular trunk is not in fact registered at the central office. Therefore, if response to the alarm is not forthcoming within a reasonable interval, one of two general categories is at fault, i.e., equipment failure or human failure. The two categories are obviously distinct and the means for alleviating them are equally distinct; in the former case the fault may be overcome by releasing the original equipment and selecting other equipment, and in the latter case the fault may be overcome by maintaining the use of the original equipment until the responsible person responds.

In view of the foregoing, a general object of this invention is to provide a switching circuit associated with an alarm transfer circuit at an unattended office, which will assure with a high degree of certitude that interested personnel will be alerted when the alarm transfer circuit is activated.

Another object is to provide switching equipment such that upon failure to receive a response from interested personnel because of equipment failure or because of human failure, the equipment automatically proceeds to alleviate the condition by circuit action which is equally effective in either case.

Another object is to provide switching equipment which is simple and inexpensive and yet capable of assuring that the function of the alarm transfer circuit is accomplished.

The invention, according to the illustrative embodiment, comprises a switching circuit interposed between an alarm transfer circuit and a pair of operator assistance trunks. Upon receipt of a signal from the alarm transfer circuit, the switching circuit tests for the availability of the operator trunks, which are each connected to the switching circuit by a single conductor, and, assuming both trunks are available, selects one to thereby alert the operator.

Concurrently with selection of the trunk, a timing device is enabled, and upon failure of the operator to respond within a predetermined interval, transfer apparatus is activated in the switching circuit to cause the transposition of the conductors from the operator trunks to the switching circuit. If the unselected trunk is available, the switching circuit causes selection of that trunk. However, if that trunk is unavailable, the switching circuit safeguards the connection by maintaining its selection of the originally selected trunk.

In either event, the cycle is repeated, and at its completion the transfer apparatus is restored to normal to again cause transposition of the trunk leads by returning them to their original state of interconnection with the switching circuit. Thus, at this time another attempt is made to seize the alternate trunk. This procedure is repeated until an operator responds at which time the timing device is inhibited.

In accordance with one feature of my invention, a switching circuit comprises apparatus arranged to bid for and seize one of a plurality of trunks, and within a predetermined interval to bid for and seize another trunk and to thereupon release the originally seized trunk.

In accordance with another feature of my invention, the switching circuit, within a predetermined interval after seizure of a first trunk, repeatedly bids for seizure of another trunk until such seizure is successful.

In accordance with another feature of my invention, the switching circuit releases a previously seized trunk only upon successful seizure of another trunk.

Figure 2:
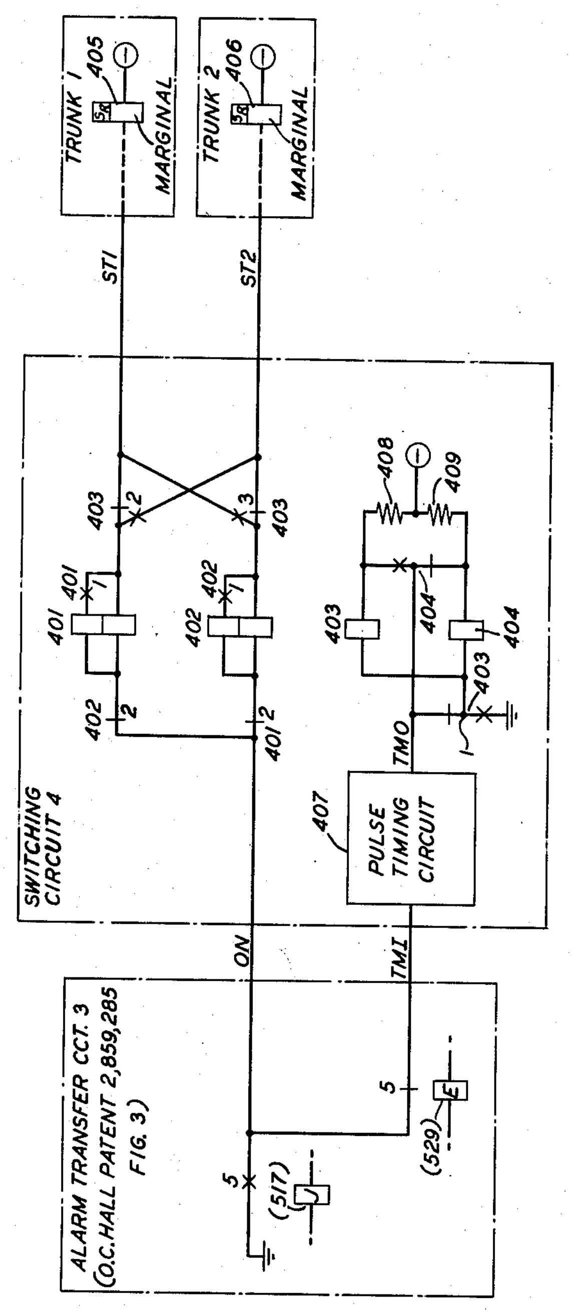

The foregoing objects and features, as well as others, of my invention will be more apparent from a consideration of the subsequent description and the drawing, in which:

FIG. 1 is essentially a block diagram showing the interrelation of the components of the exemplary embodiment; and FIG. 2 shows in greater detail some of the components including an alarm transfer circuit, a switching circuit, and two operator assistance trunks.

It will be noted that FIG. 2 employs a type of notation referred to as "detached-contact" in which an "X," shown intersecting a conductor, represents a normally open contact of a relay and a bar, shown intersecting a conductor at right angles, represents a normally closed contact of a relay; "normally" referring to the unoperated condition of a relay. The principles of this type of notation are described in an article entitled "An Improved Detached-Contact-Type Schematic Circuit Drawing" by F. T. Meyer in the September 1955 publication of the American Institute of Electrical Engineers Transactions, Communications and Electronics, vol. 74, pages 505–513.

The switching circuit of the present invention may advantageously be associated with an alarm transfer circuit such as that which is disclosed in the O. C. Hall Patent 2,859,285 issued November 4, 1950. It is to be understood, however, that my invention is not limited to use with a circuit of this type, but may be utilized by any circuit which requires automatic seizure of one of a plurality of other circuits.

The invention described herein is embodied as being associated with a circuit of the type disclosed in the cited Hall patent. It is particularly concerned with the apparatus in switching circuit 4, which is represented by the block shown with heavy lines in FIG. 1. The other equipment units are neither shown nor described in detail except where necessary for a complete understanding of the invention. The Hall patent may be consulted for a complete understanding of the construction and operation of components not covered in detail herein.

For the purpose of illustration, it is intended that alarm transfer circuit 3 be similar to the corresponding apparatus disclosed in the Hall patent, and that trunks 1 and 2 be conventionally arranged outgoing trunks to an operator positions as are well known in the art.

The interrelation and function of equipment units of the exemplary embodiment will now be described with reference to FIG. 1 wherein the interconnections between circuit blocks have been designated by means of arrows to show the direction of circuit action.

As is fully disclosed in the Hall patent, when an equipment malfunction occurs in unattended central office A, alarm transfer circuit 3 is informed of the nature of the trouble and seizes an idle one of two trunks to an operator position, such as that shown as switchboard C in FIG. 1, in order to alert the operator to the fact that the trouble condition exists. In the instant disclosure, alarm transfer circuit 3 is arranged to signal switching circuit 4 that an operator trunk is required. Switching circuit 4, thereupon performs a busy test on trunks 1 and 2 as described in detail hereinafter and, assuming both are idle, seizes one of the trunks to thereby alert the operator. It is to be noted at this point that a busy test is required, since for reasons of economy, the operator trunks are also available for use by local central office subscribers.

While only two trunks are disclosed in the embodiment, it will be obvious from a further reading of the detailed description contained hereinafter that many more trunks may be made accessible via switching circuit 4.

In the instant case, if an operator should fail to respond to the notification of trouble in the manner set forth in the Hall disclosure within a predetermined interval, switching circuit 4 is arranged to retest the previously unseized trunk for a busy condition. If the unseized trunk is idle, it is automatically seized to thereby provide a new attempt to alert the operator and the previously seized trunk is thereupon released.

However, if the previously unseized trunk is not idle, the seizure of the original trunk is maintained and a new timing interval is begun. Again, at the end of this interval a new attempt is made to seize the other trunk. This action is repeated until an operator responds.

Reference will now also be made to FIG. 2 in order to describe in detail the invention as protrayed in the illustrative embodiment.

In order to facilitate cross reference and thereby provide a clear understanding of the instant invention, the apparatus designations disclosed in the Hall patent have been retained and are enclosed by parenthesis.

As set forth in detail in the Hall disclosure, an alarm condition in the unattended office causes the operation of relay (517). The contact configuration of relay (517) may advantageously be modified as shown in FIG. 2 to ground the ON lead through make contacts 5 to thereby activate switching circuit 4. Assuming at this time that trunks 1 and 2 are idle, negative resistance battery will extend from the windings of relays 405 and 406 through control contacts not shown in trunks 1 and 2 to leads ST1 and ST2, respectively, of switching circuit 4. An obvious circuit path is thus completed to energize the lower windings of relays 401 and 402. Depending upon their relative operate times, either relay 401 or relay 402 will operate and open the operate path of the other relay. We shall assume relay 401 operates and opens its break contacts 2 thereby disabling the operate path of relay 402.

Make contacts 1 of relay 401 complete a circuit for energizing the upper winding of relay 401 in parallel with its lower winding thus causing the operation of trunk relay 405 which is marginal in operation and selected to be operative from the consequent increase in current flow resulting from the parallel energization of the windings of relay 401.

The operation of relay 405 causes the activation of trunk 1 to thereby alert an operator in a manner well known in the art.

The operation of relay (517), as set forth above, also provides a ground through its make contacts 5 and released break contacts 5 of relay (529) to enable pulse timing circuit 407 by grounding lead TMI. Pulse timing circuit 407 may advantageously be arranged as any one of several such timing circuits well known in the art so that upon receipt of an enabling signal, it momentarily grounds output lead TMO at the end of successive intervals of fixed duration. The output lead TMO of pulse timing circuit 407 is connected to a circuit configuration comprising relays 403 and 404 which are wired as a conventional relay flip-flop or pulse divider circuit. The initial state of relays 403 and 404 is a released condition prior to the provision of a ground pulse on lead TMO. The ground pulse on lead TMO causes the operation and locking of relay 403 via its transfer contacts 1 and resistance 408. The end of this pulse permits relay 404 to also operate from battery through resistance 409, the winding of relay 404 to ground at contacts 1 of relay 403. At the beginning of a succeeding pulse, relay 403 is shunt released via contact 1 of relay 404 and at the end of this pulse relay 404 also releases, since its locking ground via contacts 1 of relay 403 is no longer present, thereby restoring the pulse divider circuit to normal.

The function of pulse timing circuit 407 and the pulse divider arrangement is to control the operation of relay 403 as will be more apparent from the detailed description contained hereinafter. It should be understood, however, that numerous other arrangements may be provided to control the operation and release of relay 403 on a fixed time interval basis.

For purposes of explanation, we shall assume that lead TMO is momentarily grounded at succeeding two minute intervals. As set forth in detail in the Hall patent, when an operator responds, relay (529) operates. Break contacts 5 of relay (529) may advantageously be arranged to open lead TMI thereby disabling pulse timing circuit 407.

However, if relay (529) does not operate within the two minute interval, relay 403 operates as described above in response to a ground pulse on lead TMO. Transfer contacts 2 and 3 of relay 403 are enabled and transpose the connection of the ST1 and ST2 leads from trunks 1 and 2 to relays 401 and 402. Therefore, operated relay 401 is connected via operated transfer contacts 2 of relay 403 and the ST2 lead to relay 406 in trunk 2. If trunk 2 is idle at this time, relay 406 will operate in the same manner as described hereinbefore for relay 405.

However, if trunk 2 is not idle, the negative resistance battery will not be present on lead ST2; therefore, relay 406 will not operate and relay 401 will release. The release of relay 401 break contacts 2 completes the operate path of relay 402 which extends via make contacts 3 of relay 403 to the trunk 1 ST1 lead. The circuit path for energizing relay 405 is thus maintained through the parallel windings of relay 402. It should be noted that relay 405 is selected to be slow release so as to hold operated until relay 402 is enabled.

Thus after the trunk ST1 and ST2 leads are transposed, if trunk 2 is idle, relay 406 will operate to cause seizure. But, if trunk 2 is unavailable, relay 405 will remain operated to maintain seizure of trunk 1 via relay 402.

In either event, until response by an operator is manifested by the operation of relay (529), this cycle of repeatedly attempting seizure of an alternate trunk will be continued. The succeeding pulse from pulse timing circuit 407 releases relay 403 thereby reconnecting the ST1 and ST2 leads to relays 401 and 402, respectively.

If trunk 2 was unavailable during the last attempt, operated relay 402 is connected through to relay 406, as described before, in a new attempt at seizure.

If seizure of trunk 2 was successful in the last attempt, then relay 401 remains operated in an attempt to seize trunk 1 by completing the operate path of relay 405.

Thus at the end of a predetermined interval, a renewed attempt is made to seize an alternate trunk until an operator responds. The operation of relay (529) which signifies operator response as set forth in the Hall patent inhibits pulse timing circuit 407 and causes switching circuit 4 to maintain seizure of the associated trunk. The subsequent release of relay (517) upon removal of the alarm condition as set forth in the Hall patent opens make contacts 5 of relay (517) thereby disabling switching circuit 4.

It is therefore apparent that a circuit in accordance with my invention gives protection against both human failure and equipment failure. Thus on seizure of a first trunk, if the operator at the distant attended office fails to respond because of human failure, e.g., her inability to answer the signal present at her position because she is busy on other work, that signal remains at her position over the first trunk until a second trunk has been actually seized. Accordingly, in the interval between recognition by the circuit that the operator has not answered in the specified time and the actual seizing of a different trunk, the operator may still answer over the first seized trunk. At the same time, if the failure to answer was due to equipment failure, e.g., a failure in the seized trunk whereby no signal was presented to an operator position, a circuit in accordance with my invention corrects for this by seizing the second trunk after a specified interval. Further, this procedure of alternate seizures is repeated, with the then seized trunk not being dismissed until actual seizure of the next or alternate trunk, thereby continuing to obtain maximum assurance of answer regardless of the type of failure, i.e., equipment or human, that has prevented prior answering by an opertaor.

While the equipments of this invention have been described with reference to a particular embodiment in an arrangement whereby the switching circuit is shown as being associated with an alarm transfer circuit in order to seize an operator assistance trunk, it is to be understood that such an embodiment is intended to be illustrative of the principles of the invention and that numerous other arrangements may be devised by those skilled in the art without departing from the spirit and scope of the invention.

For example, the invention may be used where it is arranged to seize trunks in a descending preferential order; for example, upon failure to obtain response from a trunk to one destination, a second trunk to a less preferred destination is seized when it is available.

Another example would be where the invention is associated with automatic data or voice transmitting equipment to insure that operative trunk equipment is automatically connected upon demand.

What is claimed is:

1. In a communication system,
a plurality of trunks interconnecting an unattended location and another location,
alarm transfer means at said unattended location comprising means responsive to a trouble condition for seizing one of said trunks,
timing means activated after a predetermined interval upon failure to complete a connection through said one of said trunks,
means enabled by said activated timing means for repeatedly attempting seizure of another of said trunks until said other trunk is seized, and
means operative only upon seizure of said other trunk for releasing said one trunk.

2. In a communication system,
a plurality of circuits,
timing means, means for enabling said timing means, and
transfer means comprising first means for seizing an idle first one of said circuits,
second means controlled by said enabled timing means for periodically bidding for seizure of another of said circuits, and
third means operative upon seizure of said other circuit for releasing said first circuit.

3. In a telephone system,
an unattended office,
another office,
timing means in said unattended office,
a plurality of trunks interconnecting said unattended office and said other office, and
alarm transfer means comprising means responsive to a trouble condition in said unattended office for seizing an idle first one of said trunks, means for enabling said timing means,
means activated by said enabled timing means for seizing another of said trunks, and
means operative only upon seizure of said other trunk for releasing said first trunk.

4. In a telephone system,
an unattended office,
another office,
timing means in said unattended office,
a plurality of trunks interconnecting said unattended office and said other office, and
alarm transfer means in said unattended office comprising means responsive to a trouble condition in said unattended office for seizing an idle first one of said trunks, means for enabling said timing means,
means activated by said enabled timing means for repeatedly attempting seizure of another of said trunks until said other trunk is seized, and
means operative only upon seizure of said other trunk for releasing said first trunk.

5. In a telephone system,
an unattended office,
another office,
timing means in said unattended office,
a plurality of trunks interconnecting said unattended office and said other office, and
alarm transfer means comprising means responsive to a trouble condition in said unattended office for initiating seizure of one of said trunks, means for enabling said timing means,
first means activated in response to the idle condition of a first one of said trunks for seizing said first trunk,
second seizing means normally activated in response to the idle condition of a second one of said trunks, but disabled by said activated first seizing means, and
switching means controlled by said enabled timing means for associating said first seizing means with said second trunk and said second seizing means with said first trunk,
said first seizing means comprising means for remaining activated only in response to an idle condition of said second trunk, and
said second seizing means comprising means activated in response to the deactivation of said first means for maintaining seizure of said seized first trunk.

6. In a telephone system,
the combination set forth in claim 5 wherein said first and second seizing means each comprise a relay device.

7. In a telephone system, the combination set forth in claim 5 wherein said switching means comprises a relay device arranged to control a set of contacts including at least two transfer contacts.

8. In a telephone system, timing means, means for enabling said timing means, a switching circuit comprising first seizing means connected to one trunk and second seizing means connected to another trunk, said first seizing means comprising means operative in response to an idle condition of said one trunk for seizing said one trunk, and means for inhibiting said second seizing means upon seizure of said one trunk, and transfer means controlled by said enabled timing means for transposing the interconnection between said first and second seizing means and said trunks, respectively, said first seizing means further comprising means responsive to a busy indication of said other trunk connected by said transposition for releasing said first seizing means, and said second means comprising means responsive to release of said first means for maintaining seizure of said one trunk.

9. In a telephone system, timing means comprising a first relay, means for enabling said timing means, a first and a second trunk circuit, first seizing means comprising a second relay for seizing said first trunk, second seizing means comprising a third relay for seizing said second trunk and controlled by said first seizing means, a conductor connecting said first seizing means to said first trunk, another conductor connecting said second seizing means to said second trunk, and transfer means comprising a set of contacts on said first relay controlled by said enabled timing means for transferring the connection of said conductor from said first trunk to said second seizing means and for transferring the connection of said other conductor from said other trunk to said first seizing means, said first seizing means further comprising means including two windings on said second relay connected in parallel responsive to an idle indication from said second trunk for seizing said second trunk, said first seizing means further comprising means including a first winding on said second relay responsive to a busy indication from said second trunk for releasing said first seizing means, and said second seizing means further comprising means including two windings on said third relay connected in parallel enabled only in response to the release of said first seizing means for maintaining seizure of said first trunk.

10. In a telephone system, a pair of trunks each comprising a slow release, marginally operated relay, an alarm transfer circuit connected in common to the seizure paths of said trunk relays for energizing said trunk relays in the presence of an alarm condition, and a switching circuit interposed in said trunk relay seizure paths between said alarm transfer circuit and said pair of trunks comprising a pair of double wound relays each having its operate windings connected in parallel in the seizure path of a corresponding trunk relay and break contacts in the operate path of the other trunk relay, a transfer relay having contacts in each trunk relay seizure path for interchanging the connections of the double wound relays to the trunk relays, and a timing circuit activated by said alarm transfer circuit for periodically energizing said transfer relay for predetermined intervals of time.

No references cited.